United States Patent [19]
Aoki et al.

[11] Patent Number: 4,592,962
[45] Date of Patent: Jun. 3, 1986

[54] PROCESS FOR ACETYLATING A WOOD MATERIAL

[75] Inventors: Eiichi Aoki; Hideyuki Kobayashi, both of Okayama, Japan

[73] Assignee: Daiken Trade & Industry Co., Ltd., Toyamo, Japan

[21] Appl. No.: 609,149

[22] Filed: May 11, 1984

[30] Foreign Application Priority Data

May 12, 1983 [JP] Japan ................................. 58-83938

[51] Int. Cl.$^4$ ...................... B05D 1/18; B05D 3/02; D06M 13/20
[52] U.S. Cl. ...................................... 428/541; 8/121; 427/325; 427/382; 427/440
[58] Field of Search ............... 427/297, 298, 440, 325, 427/382; 8/121; 428/541

[56] References Cited

U.S. PATENT DOCUMENTS 3,094,431 6/1963 Goldstein et al. ............... 427/298 X
3,649,341 3/1972 Tammela et al. ................... 8/121 X

OTHER PUBLICATIONS

Forest Product Journal, 1961 (a), pp. 363–370.
Plastic Materials, No. 17, "Fiber Resin", pp. 55–60, Nikkan Kogyo Shimbusta.

Primary Examiner—Michael R. Lusignan
Attorney, Agent, or Firm—Scully, Scott, Murphy & Presser

[57] ABSTRACT

A process for acetylating a wood material which comprises impregnating the wood material with an aqueous solution of an alkali metal acetate, drying the wood material containing the alkali metal acetate solution, and treating the dried wood material with acetic anhydride optionally diluted with an organic solvent at temperature between 100° C. and 150° C.

12 Claims, No Drawings

PROCESS FOR ACETYLATING A WOOD MATERIAL

The present invention relates to a process for improving the quality of a wood material and, more particularly, to an improved process for the acetylation of the wood material to impart, for example, an increased resistance both to decay and to deformation thereto.

It is to be noted that the term "wood material" hereinabove and hereinafter employed for the purpose of the description of the present invention is to be understood as including lumbers, boards, strips, chips, fiber and any other material made of wood.

A wood material has long been used as a material for buildings, furniture, fixtures, etc. Although the wood material generally has numerous desirable properties, it also has some disadvantageous properties as a material for many structural purposes. One of them is that the wood material is susceptible to decay by the action of a great number of fungi and/or termites. In recent years, such problem associated with the decay of the wood material has been rather increasing in modernized buildings which have an air-tight structure and are continuously air-conditioned.

Another disadvantageous property inherent in the wood material is that it is susceptible to deformation, such as warpage, torsion, expansion and contraction, due to repeated absorption and release of moisture depending on the surrounding climate conditions.

It is already known that acetylation of a wood material is very helpful in solving the above problems. For instance, Irving S. Goldstein et al. describe the process for acetylating a wood material in the absence of a catalyst in U.S. Pat. No. 3,094,431 and Forest Products Journal, 1961 (8), 363–370. However, the Irving's process takes much time for completing the acetylation. In addition, the following disadvantages inherent in the acetylation reaction have not been solved by this method.

(1) Acetic acid formed during the acetylation reaction accumulates in an acetylating agent, i.e., acetic anhydride, and lowers the acetylation efficiency of the agent. In addition, the acetic acid itself causes swelling and deterioration of the wood material.

(2) In general, a wood material to be acetylated contains a considerable amount of water, which reacts with acetic anhydride penetrated into the wood material to form acetic acid. Thus, the water contained in the wood material reduces the acetylation efficiency of the acetylating agent.

On the other hand, the process for acetylating cellulose per se in the presence of a catalyst is also known. The typical method for the acetylation of cellulose is a so-called "sulfuric acid-catalization method", and disclosed in Prastic Materials, No. 17, "Fiber Resin", 55–66, published by Nikkan Kogyo Shimbunsha in Japan(1970). This method comprises treating cellulose with a mixture of acetic acid and a catalytic amount of sulfuric acid and subsequently treating the cellulose with an acetylating agent comprising acetic anhydride. When this method is applied to a wood material, the above disadvantages can be reduced. However, this method causes the following different disadvantages:

(1) Surfuric acid causes carbonization, deterioration or discoloration of the wood material.

(2) After completion of the acetylation, it is very difficult to remove the sulfuric acid remaining the wood material, which has the indesirable action as stated above.

Another typical method of acetylation of cellulose as previously known is "perchloric acid-catalization method" which is also described in the literature mentioned above. However, this method, when applied to a wood material, also exhibits the similar disadvantages as in sulfuric acid-catalization method and, therefore, is not satisfactory.

As stated above, any of the previously known methods is not suited for the acetylation of a wood material and, therefore, an improved method for acetylating a wood material has long been desired, which permits easy and economical production of the wood material having improved properties such as a high resistance to decay, a high resistance to change in dimension and a high durability.

According to the present invention, there is provided an improved process for acetylating a wood material, which comprises impregnating the wood material with an aqueous solution of an alkali metal acetate, drying the wood material containing the alkali metal acetate solution, and treating the dried wood material with acetic anhydride optionally diluted with an organic solvent at a temperature between 100° C. and 150° C.

It is to be noted that the wordings "acetylation of a wood material" and "a wood material is acetylated" used in this specification is intended to mean the acetylation of the constituents of a wood material, particularly, hydroxyl groups of cellulose which is the major component of the wood material.

The improved process for acetylating a wood material according to the invention is detailed below.

The first step of the process of the invention consists of impregnating the wood material with an aqueous solution of an alkali metal acetate which, for the purpose of the present invention, means an alkali metal salt of acetic acid, in particular, sodium acetate and potassium acetate. The concentration of the alkali metal acetate in the solution is not critical, but usually ranges between 2 and 30% by weight. Such impregnation can be accomplished by simply dipping the wood material in the aqueous solution of an alkali metal acetate. However, the use of the aqueous solution of an alkali metal acetate having an elevated temperature between 40° C. and 80° C. is advantageous in accelerating the impregnation. In addition, a sufficient impregnation can be attained in a short time by the use of a pressure impregnation technique wherein the impregnation is carried out under pressure, a vacuum impregnation technique wherein a wood material is first placed under reduced pressure for the purpose of deaeration and subsequently the impregnation is carried out at atmospheric pressure, or a vacuum-pressure impregnation technique wherein the wood material is first subjected to the deaeration in the same manner as in the vacuum impregnation technique and, thereafter, the impregnation is carried out under pressure as in the pressure impregnation technique, using a reactor resistant to both positive and negative pressures.

The amount of the alkali metal acetate to be penetrated into the wood material is generally 2 to 20% by weight, preferably 5 to 18% by weight, based on the dry weight of the wood material to be treated.

The second step of the process of the invention is drying the wood material obtained in the first step. This step is carried out by using a conventional dryer for the purpose of removing most of water contained in the wood material. The drying is preferably conducted so that the water content of the wood material may decrease to less than 5% by weight of the wood material, whereby an efficient acetylation in the subsequent step can be accomplished.

The dried wood material thus obtained is then subjected to acetylation, the last step of the process of the invention. The acetylation can be carried out by the use of either acetic anhydride or acetic anhydride diluted with an organic solvent.

(A) Acetylation with acetic anhydride

Acetylation is carried out, for example, by adding acetic anhydride to the dried wood material charged in the reactor and heating them to a temperature not lower than 100° C., preferably between 100° C. and 140° C. The reaction time required for the acetylation varies depending on the reaction conditions. However, the reaction is generally conducted to an extent that the weight of the wood material increases about 15% with respect to the starting weight. It should be noted that acetic anhydride already heated to an elevated temperature can be added to the wood material in order to shorten the reaction time.

During the above treatment, the precipitates of the alkali metal acetate which have been uniformly dispersed within the wood material catalyze the reaction between acetic anhydride and hydroxyl groups of the cellulose of the wood material, and an efficient acetylation of the material is accomplished. Since the wood material has been dried in the second step and contained only a small amount of water reactable with acetic anhydride, undesirable decomposition of the latter into acetic acid can be remarkably reduced as compared with non-dried wood material.

The wood material acetylated in a manner as stated above warps and twists very little, and has an improved resistance to deformation, an improved resistance to decay and an improved durability. In addition, the alkali metal acetate, a catalyst in the acetylation reaction, gives no disadvantage to the wood material even if it remains within the wood material after washing of the material with water. Accordingly, no deterioration of the wood material arises due to the remaining catalysts such as occurring in the case of the sulfuric acid-catalization method and the perchloric acid-catalization method.

The above process can overcome major parts of the aforementioned drawbacks inherent in the prior art. However, the formation of acetic acid, which is a by-product of the acetylation reaction, cannot be obviated. Since it is usual that acetic anhydride is recyclically employed in the acetylation reaction, the acetic acid formed as a by-product accumulates in the acetic anhydride and lowers the acetylation efficiency. The inventors have now found that such inconvenience caused by the acetic acid accumulated in acetic anhydride can be avoided by incorporating an alkali metal acetate into acetic anhydride employed as an acetylating agent. The alkali metal acetate to be added to acetic anhydride can be identical with or different from the alkali metal acetate penetrated into the wood material during the first step. By this treatment, the acetic acid which has been formed during the acetylation reaction and exuded from the wood material reacts with the alkali metal acetate to form a complex in accordance with the following reaction scheme, whereby the apparent concentration of free acetic acid in the acetic anhydride solution can be maintained within a limited level and, accordingly, decrease of the acetylating rate of the solution due to the free acetic acid can be avoided.

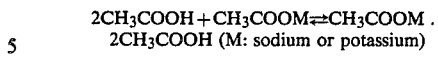
2CH$_3$COOH (M: sodium or potassium)

The complex dissolved in the acetic anhydride solution precipitates by lowering the temperature of the acetic anhydride solution, for example, down to about 20° to 40° C. The precipitate is separated by filtration from acetic anhydride and the latter can be recycled for another acetylation reaction. On the other hand, the alkali metal acetate can be recovered from the separated complex by treating the latter with an alkali metal hydroxide solution, for example, sodium or patassium hydroxide solution.

As will be understood from the above description, one of the preferred embodiments of the present invention comprises impregnating a wood material with an aqueous solution of an alkali metal acetate, drying the wood material containing the alkali metal acetate, and treating the dried wood material at temperature between 100° C. and 140° C. with acetic anhydride admixed with an alkali metal acetate, the first mentioned and second mentioned alkali metal acetates being identical or different from each other.

(B) Acetylation with acetic anhydride diluted with an organic solvent

The acetylation can also be conducted according to the general procedure described in (A) except that acetic anhydride diluted with an organic solvent is employed instead of acetic anhydride alone and that the acetylation reaction is conducted at temperature between 100° C. and 150° C.

Before the description proceeds, it is to be noted that the organic solvent useable in the practice of the present invention to dilute the acetic anhydride includes all kind of organic solvent, excepting (1) those capable of reacting with acetic anhydride, such as alcohols; (2) those making a wood material swell to a great extent, such as pyridine and formaldehyde; (3) those being more expensive than acetic anhydride; and (4) those having an extremely lower boiling point. Preferred organic solvents are aromatic hydrocarbons such as benzene, toluene and xylenes, and a mixture thereof.

In contrast to the aforementioned process (A) wherein an expensive acetic anhydride is solely used, this modified process employs a mixture of less expensive organic solvent and acetic anhydride. Accordingly, acetylation of a wood material according to the modified process can be accomplished more economically than the process (A). However, another and important advantage of the modified process involving the dilution of acetic anhydride with an organic solvent resides in the following point: Acetic anhydride has a strong extractability of various components of a wood material. Therefore, acetic anhydride used for the acetylation of the wood material will get contaminated by the extracted components. Such extraction of the components causes a decreasing of the acetylating efficiency of the acetic anhydride on the one hand and a loss in strength of the wood material on the other hand.

It has been found that such disadvantage as stated above can be remarkably diminished by using acetic anhydride diluted with the organic solvent and that the decrease of the acetylating efficiency due to the dilution of acetic anhydride is negligible.

Acetic anhydride has a strong irritating and stimulating odor and, therefore, the use of a great amount of acetic anhydride, especially at a hot state, is unfavorable to workers from the viewpoint of environment hygiene. Such disadvantage can also be minimized by the use of a mixture of acetic anhydride and an organic solvent.

The concentration of acetic anhydride in the mixture may range between 20 and 70% by weight. The reaction rate may fall if the concentration is below the lower limit, and the aforementioned advantage may decrease if the concentration is above the upper limit.

As will be readily understood from the above description, another preferred embodiment of the present invention comprises impregnating a wood material with an aqueous solution of an alkali metal acetate, drying the wood material containing the alkali metal acetate, and treating the dried wood material at temperature between 100° C. and 150° C. with a mixture of acetic anhydride and an organic solvent, the concentration of the acetic anhydride in the mixture ranging between 20 and 70% by weight.

By the preferred method described above, the drawbacks of the prior art can be substantially overcome. However, the most preferred embodiment of the present invention is the one which corresponds to the process just mentioned above and further comprises an additional step consisting of pre-impregnating the wood material with acetic anhydride optionally diluted with an organic solvent after the second step and before the last acetylation step.

Since a wood material has a complex tissue structure which hampers a uniform penetration of an acetylating agent comprising acetic anhydride, the last acetylation step sometimes fails to accomplish a rapid and sufficient acetylation of the wood material. Such disadvantage can be overcome by the addition of the pre-impregnation step of the acetylating agent prior to the last actylation step.

The pre-impregnation of the dried wood material with the acetylating agent can be attained by simply dipping the wood material in the agent. However, in order to obviate uneven impregnation of the agent due to the air present within the wood material, it is preferred to conduct the dipping under pressure. In addition, it is most preferred to conduct deaeration of the wood material under reduced pressure prior to the dipping.

The final step, i.e., the acetylation of the wood material pre-treated as above can be conducted exactly in the same manner as previously stated.

The acetylated wood materials obtained in accordance with any one of the processes described above can be processed in the same manner as non-acetylated wood materials to obtain various semi-finished or finished wood products. For instance, the strip, chip and fiber acetylated by the process of the invention can be processed to plywood or laminated veneer lumber, particle board and fiber board respectively.

The following detailed examples are presented by way of illustration of certain specific embodiments of the invention.

EXAMPLE 1

A batch of ten spruce veneers of 3 mm×60 mm×55 mm in size are impregnated with a 5% aqueous sodium acetate solution by the use of the vacuum-pressure impregnation technique and then dried absolutely. This yields the dried veneers containing 13% by weight of sodium acetate. The veneers are dipped in a mixture consisting of m-xylene and acetic anhydride (60:40 by weight) heated to about 125° C. and kept in the mixture for 30 minutes, whereby acetylation of the wood material takes place. After the completion of the reaction, the veneers are placed under reduced pressure for removing the mixture left within the boards, washed with hot water and dried. The acetylated veneers are thus obtained. The average value of the weight gains of the veneers, i.e., the apparent acetylation rates of the veneers, is 23 percent by weight.

The above process is repeated ten times under the same conditions using the same mixture supplemented with a fresh mixture required for compensating the consumed acetic anhydride, while fresh spruce veneers are employed each time. The average value of the acetylation rates is not less than 20 percent by weight in each trial. Any deterioration such as crack is not observed in all of the resultant acetylated boards.

EXAMPLE 2

A batch of ten hemlock veneers of 3 mm×60 mm×60 mm in size (about 40 g) are impregnated with a 5% aqueous sodium acetate solution and dried in the same manner as in Example 1.

Sodium acetate (10 g) is added to acetic anhydride (500 g), and the mixture is heated to 120° C. The dried veneers obtained above are dipped in the hot mixture, and acetylation is allowed to proceed for 30 minutes.

The above process is repeated ten times using the same mixture supplemented with fresh acetic anhydride required for compensating the consumed anhydride, while a fresh batch of ten hemlock veneers is employed each time. The average acetylation rate of the last batch is 24 percent by weight, which nearly equals to the average acetylation rate of the first batch. Thus, substantial decrease of acetylation efficiency is not observed on the reactant mixture which have been reused no less than ten times.

A half of the liquid portion of the mixture is removed from the reactor and cooled to 20° C., whereby a complex, consisting of acetic acid formed during acetylation and sodium acetate come from the mixture, precipitates. The complex is separated from the liquid portion of the mixture, and the latter is returned to the reactor. On the other hand, the complex, after having been dissolved in water, is decomposed to sodium acetate and acetic acid by the addition of a 10% aqueous sodium hydroxide solution. The recovered sodium acetate is also returned to the reactor.

In the same manner as described above, a fresh batch of hemlock veneers is treated in the reactor charged with the recovered mixture to obtain the acetylated veneers having an acetylation rate of 24 percent by weight and high strength characteristics.

EXAMPLE 3

A batch of ten spruce veneers of 3 mm×60 mm×55 mm in size are impregnated with a 5% aqueous sodium acetate solution and then absolutely dried in the same manner as in Example 1. This gives the veneers containing 15% by weight of sodium acetate. The veneers are then subjected to deaeration under reduced pressure over ten minutes and impregnated with a mixture consisting of m-xylene and acetic anhydride (60:40 by weight) under pressure.

The resultant veneers which contain sodium acetate and the mixture are dipped in the same kind of a mixture heated to about 125° C. and kept in the mixture for 20 minutes at the same temperature. After the completion of the reaction, the veneers are placed under reduced pressure for removing the mixture left therein, washed with hot water and dried. The veneers having an average acetylation rate of about 25 percent are thus obtained.

The above process is repeated ten times under the same conditions using the same mixture supplemented with a fresh mixture required for compensating the consumed acetic anhydride, while a fresh batch of ten spruce veneers is employed each time. The average value of the acetylation rates of the resultant veneers is not less than 20 percent by weight in each trial. Any deterioration such as crack is not observed in all of the resultant acetylated veneers.

What is claimed is:

1. A process for acetylating a wood material which comprises:
   (a) impregnating the wood material with an aqueous solution of an alkali metal acetate until the alkali metal acetate penetrating into the wood material comprises 2 to 20% by weight of the dry weight of the wood material,
   (b) drying the wood material containing the alkali metal acetate solution,
   (c) impregnating the dried wood material with acetic anhydride for a period of time effective to cause the acetylation of the wood material, said acetic anhydride being at a temperature of 100° C. to 150° C.

2. The process according to claim 1, wherein said impregnation step (a) is accomplished under pressure conditions effective to deaerate said wood material and impregnation of said aqueous alkali metals solution accomplished under pressure conditions effective to accelerate impregnation.

3. The process according to claim 1, wherein the impregnation of step (c) is accomplished with an admixture of acetic anhydride and alkali metal acetate.

4. The process according to claim 1, wherein the impregnation of step (c) is accomplished with an admixture of acetic anhydride and an organic solvent.

5. The process according to claim 4, wherein the organic solvent is benzene, toluene, xylenes or mixtures thereof.

6. The process according to claim 5, wherein the weight ratio of acetic anhydride and the organic solvent ranges from 20:80 to 70:30.

7. The process according to claim 1, comprising an additional step of pre-impregnating the dried wood material with acetic anhydride, said additional step being carried out subsequent to drying step (b) and prior to impregnating step (c).

8. An acetylated wood material obtained by any one of the processes disclosed in any one of claims 1 to 7.

9. The process according to claim 1, wherein the alkali metal acetate is sodium acetate or potassium acetate.

10. The process according to claim 1, wherein impregnation step (a) is accomplished by elevating the temperature of said aqueous alkali metal solution to about 40° C. to about 80° C.

11. The process according to claim 1, wherein said impregnation step (a) is accomplished under pressure conditions effective to accelerate the impregnation of said aqueous alkali metal acetate solution.

12. The process according to claim 1, wherein said impregnation step (a) is accomplished under pressure conditions effective to deaerate said wood material and impregnation of said aqueous alkali metal acetate solution being accomplished at atmospheric pressure.

* * * * *